United States Patent
Ashoori et al.

(10) Patent No.: US 10,393,355 B2
(45) Date of Patent: Aug. 27, 2019

(54) LIGHTING PATTERN OPTIMIZATION FOR A TASK PERFORMED IN A VICINITY

(71) Applicant: International Business Machines Corporation, Armonk, NY (US)

(72) Inventors: Maryam Ashoori, White Plains, NY (US); Jonathan H. Connell, Cortlandt-Manor, NY (US); Robert G. Farrell, Cornwall, NY (US); Justin D. Weisz, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/447,340

(22) Filed: Mar. 2, 2017

(65) Prior Publication Data

US 2018/0252396 A1 Sep. 6, 2018

(51) Int. Cl.
| | |
|---|---|
| *F21S 2/00* | (2016.01) |
| *F21V 21/15* | (2006.01) |
| *F21V 23/04* | (2006.01) |
| *H05B 33/08* | (2006.01) |

(52) U.S. Cl.
CPC ............... *F21V 21/15* (2013.01); *F21S 2/00* (2013.01); *F21V 23/0471* (2013.01); *H05B 33/08* (2013.01)

(58) Field of Classification Search
CPC ................................ F21V 21/15; F21V 14/02
USPC ......................................................... 362/386
See application file for complete search history.

(56) References Cited

U.S. PATENT DOCUMENTS

| | | | | |
|---|---|---|---|---|
| 4,392,187 A | * | 7/1983 | Bornhorst | F21S 2/00 362/233 |
| 5,010,459 A | * | 4/1991 | Taylor | G05B 19/0421 315/292 |
| 6,139,164 A | * | 10/2000 | Bolta | F21L 14/04 248/454 |
| 6,266,134 B1 | * | 7/2001 | Gelbart | B29C 35/0894 264/401 |
| 7,604,375 B2 | | 10/2009 | Rains, Jr. et al. | |

(Continued)

OTHER PUBLICATIONS

Anonymous, "pinokio:Adam Ben-Dror", retrieved online URL:<http://www.ben-dror.com/pinokio>, 1 page.

(Continued)

*Primary Examiner* — Bryon T Gyllstrom
(74) *Attorney, Agent, or Firm* — Cantor Colburn LLP; Rahan Uddin (57) ABSTRACT

A cognitive illumination system is provided. The cognitive illumination system includes a light source communicatively coupled to a servomechanism, wherein the servomechanism is configured to manipulate the light source in space, a tracking assembly configured to capture and track objects in the space and a processor communicatively coupled to the light source, the servomechanism and the tracking assembly. The processor is configured to receive information about the captured and tracked objects from the tracking assembly, determine a task being undertaken in the space therefrom, develop a lighting plan for the task which is executable by the light source and the servomechanism and control the light source and the servomechanism according to the lighting plan.

19 Claims, 5 Drawing Sheets

(56) References Cited

U.S. PATENT DOCUMENTS

| | | | | |
|---|---|---|---|---|
| 7,646,029 | B2* | 1/2010 | Mueller | F21K 9/00 257/13 |
| 9,066,381 | B2 | 6/2015 | Valois et al. | |
| 9,526,156 | B2* | 12/2016 | LaDuke | G01S 11/00 |
| 2002/0149927 | A1* | 10/2002 | Westhofen | F21L 14/04 362/147 |
| 2008/0062681 | A1* | 3/2008 | Belliveau | F21S 10/007 362/231 |
| 2010/0066267 | A1* | 3/2010 | Meyer | H05B 37/0272 315/294 |
| 2010/0200753 | A1* | 8/2010 | Westaway | F21V 17/02 250/338.1 |
| 2010/0259931 | A1* | 10/2010 | Chemel | F21S 8/08 362/249.02 |
| 2012/0206050 | A1* | 8/2012 | Spero | B60Q 1/04 315/152 |
| 2015/0035437 | A1* | 2/2015 | Panopoulos | F21V 14/02 315/112 |
| 2016/0004237 | A1 | 1/2016 | Mohan et al. | |

OTHER PUBLICATIONS

Anonymous, "SmartGuard Floodlight Camera", retrieved online URL:<http://www.ben-dror.com/pinokio>, 1page.

Dario, C., Marco, "An Investigation of Feasibility of Uncalibrated and Unconstrained Gaze Tracking for Human Assistive Applications by Using Head Pose Estimation", Sensors, 2014, 17 pages.

Fathi et al., "Learning to Recognize Daily Actions using Gaze", Proceeding ECCV'12 Proceedings of the 12th European conference on Computer Vision, 2012, pp. 314-327.

Li et al., "Learning to Predict Gaze in Egocentric Video", Proceeding ECCV'13 Proceedings of the 2013 IEEE International Conference on Computer Vision, 2013, pp. 3216-3223.

Yamada et al., "Attention Prediction in Egocentric Video Using Motion and Visual Saliency", Advances in Image and Video Technology, 2012, pp. 277-288.

Anonymous, "Augmented Reality Kitchens Teach You to Cook", retrieved online URL:<http://www.livescience.com/22446-augmented-reality-kitchens-teach-you-to-cook.html>, 5 pages.

* cited by examiner

LIGHTING PATTERN OPTIMIZATION FOR A TASK PERFORMED IN A VICINITY

BACKGROUND

The present invention relates to lighting patterns and, more particularly, to systems, methods and computer program products for optimization of a lighting plan or pattern for a task that is performed in a vicinity of lighting devices where the optimization anticipates trajectories and tracks objects.

Adequate lighting is necessary for humans to perform tasks. A variety of lighting systems have been developed with the general goal of providing adequate lighting for performing tasks. For example, workplace lighting systems attempt to ensure that all parts of a workplace, both internally and externally, are adequately illuminated. This can entail the provision of both ambient or background lighting to maintain safe working areas and specific lighting at machinery and workstations where a higher level of lighting can be required to illuminate potential hazards associated with performing the task.

SUMMARY

According to embodiments of the present invention, a cognitive illumination system is provided. The cognitive illumination system includes a light source communicatively coupled to a servomechanism, wherein the servomechanism is configured to manipulate the light source in space, a tracking assembly configured to capture and track objects in the space and a processor communicatively coupled to the light source, the servomechanism and the tracking assembly. The processor is configured to receive information about the captured and tracked objects from the tracking assembly, determine a task being undertaken in the space therefrom, develop a lighting plan for the task which is executable by the light source and the servomechanism and control the light source and the servomechanism according to the lighting plan.

According to embodiments of the present invention, a computer-implemented method of operating a cognitive illumination system is provided. The computer-implemented method includes recognizing, by a processor, a presence of objects in a space, identifying the types of objects, relationships between objects, functions and anticipated trajectories of the objects and developing an optimal lighting plan for the objects from the identified object types, relationships, functions and trajectories.

According to embodiments of the present invention, a computer program product provides a cognitive illumination system and includes a processing circuit and a memory having program instructions stored thereon for enabling the processing circuit to execute a method. The method includes capturing and tracking objects in a space, determining a task being undertaken in the space from information of the captured and tracked objects, developing an adjustable lighting plan for the task which is executable by a light source and a servomechanism to which the light source is coupled and which is configured to manipulate the light source in the space and controlling the light source and the servomechanism in accordance with the adjustable lighting plan.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Having sufficient light to perform a complex task is often a challenge. While portable lighting sources can be available, they are not always convenient to access or use. Wall lamps and other lighting sources with a fixed base are more common but, in industrial settings where sufficient lighting is critical and adaptive or thoughtful lighting responses are needed (e.g., a physician's assistant during a surgical procedure in which tasks can be complex, changed quickly and involving special lighting settings), fixed lighting is often insufficient and human lighting support is required.

While there are embedded or cloud-based technologies available that can understand a scene and recognize the types of 3-D objects in the scene, their relative configuration and their spatial relationships with a camera, there are no technologies that provide for optimizing a lighting pattern for a recognized task being performed with the 3-D objects in the scene. For example, some researchers have identified techniques for simple action recognition given a gaze direction or for predicting a gaze given daily activities or eye-head/hand coordination. Other cases involve lighted cameras that illuminate and record people as they move around a space but use nothing more than a movement sensor to do so such as security monitoring systems. Such lighting systems tend to lack task recognition capability among other features and thus cannot adapt to various situations that might arise. Other cases make use of augmented reality systems but again such systems tend to lack task recognition capabilities and are not adaptive.

Still other systems relate to theatrical stage lighting. Here, lighting shifts around to various parts of the stage, changes color or tracks specific performers. Although there are semi-automated systems available that are based on timing or music recognition, generally there is a human operator on duty who presses a button to temporally sync a pre-programmed lighting pattern to the staged content. There are no systems that automatically track actors, props or interpret dialog to determine theatrical onstage actions and automatically cue and configure lighting to track the action.

It is seen then that although there are some systems available for motion tracking of objects, these systems do not recognize types of objects that need lighting, try to optimize lighting behavior given the location and configuration of those objects relative to the lighting devices or compute the relationship between objects when determining a lighting pattern. While there has been activity in recognizing certain objects, this is not tied into optimizing a lighting pattern. Finally, the trajectories of objects are not anticipated and used for computing a lighting plan.

Generally, tasks that are undertaken by people involve interactions between those people and surrounding objects in a given space. As such, if one desired to analyze a task being undertaken in the space so that a partial object can be optimally illuminated, it is necessary to find and locate people therein and then to find and locate the surrounding objects for illumination.

Finding people in space can be done in some situations by looking specifically for their faces with the sizes of those faces in a 2-D camera giving an indication of radial distance between the camera and the person. This combined with a height estimate and the known pose of the camera can be used to infer a 3-D position for the person's eyes. Sometimes, however, people are not facing the camera or sensor (e.g., they can have their back to the camera or can be looking downward at a book). In these cases, a 3D camera or sensor (e.g., a Kinect™) can be used to extract a depth map of the scene and from this generate candidate positions for heads and hands. Alternatively, people can be found using background subtraction or optical flow to generate a silhouette whose shape is analyzed to find a head position. Still another possibility would be to recognize body parts directly based at least in part on collections of local interest points.

Finding the objects to be illuminated, again, might be done using a 3D camera or sensor to look for example for flat rectangular planes suggestive of books or by using scale-invariant feature transform (SIFT) or speeded up robust features (SURF) to directly identify and localize a wider variety of items. In any case, sometimes not all objects detected are relevant to a task. That is, if a user's face is found, sometimes his gaze angle can also be determined. Intersecting this gaze angle with potential detections gives some clue about which objects are to be considered important even if they can't be seen. Similarly, if the user's hands can be found (e.g., via 3D skeleton tracking, motion energy, or direct recognition), objects near these locations are likely to be more important. In general, we imagine that the tasks developed for cognitive illumination are determined by the target space where the lamp is placed, if it is fixed, and the types of people and objects that operate or inhabit that space. Cognitive illumination could be configurable with the person selecting the possible objects and potential types of lighting appropriate to the space.

Generating a lighting plan is largely a matter of geometry. Generally, for each object that is found in a space, there is a spot size, brightness, color, color composition and direction of illumination appropriate for that object. If there are multiple sources of illumination, it can be necessary to assign each object to a primary illuminator. For example, mini-spot A can be aimed at a croissant in a user's left hand, wide illuminator B can be tasked with lighting up a plate on a table and mini-spot C can be aimed at crumbs accumulating in the user's lap. The assignment of illuminators to objects can be based at least in part on incident angles and the presence of occluding objects in proposed light paths. Then, if a 3-D model of the space including the user(s) and objects can be created, ray tracing methods can be used to evaluate and if necessary re-evaluate a particular configuration of the light source(s).

As will be described below, a "cognitive lamp" or "cognitive illumination" system is provided to take into account the presence of objects in a space as well as the types of objects and their relationships (scene understanding), their functions and their anticipated trajectories. The cognitive lamp or cognitive illumination system computes optimal lighting patterns and thus goes above and beyond a low-level tracking of a single object using a light. The effect is to have an overall, intelligent configuration of the lighting sources that tracks objects, determines probable tasks being performed with the objects and uses the probable tasks and object information to anticipate trajectories of the objects.

In various embodiments of the invention, one can interact with multiple devices through natural language (e.g., speech) or by mechanically steering and manipulating parts to achieve a desired lighting or sensing effect. Such actions can be recorded for later updates to training or default data sets. In accordance with further embodiments of the invention, machine learning algorithms can learn from this training data to automatically adjust lighting or sensor features for similar situations. Feedback on operation generally can be provided through sound or lighting effects.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models and at least four deployment models.

The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
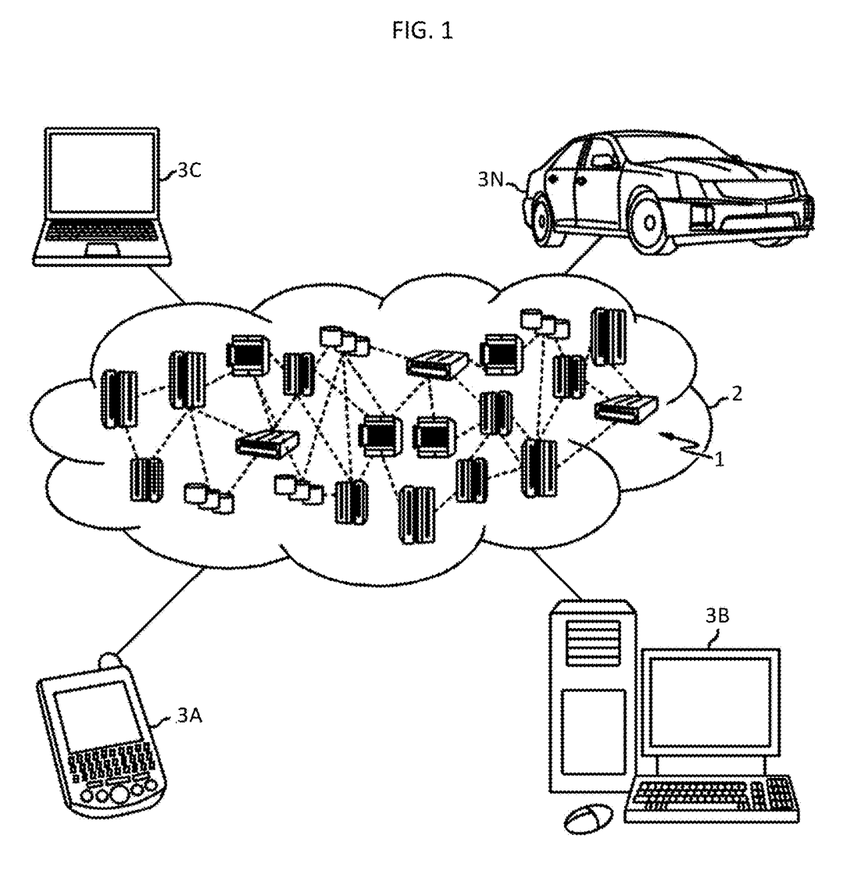
FIG. 1 depicts a cloud computing environment in accordance with embodiments of the present invention.

Referring now to FIG. 1, illustrative cloud computing environment 1 is depicted. As shown, cloud computing environment 2 includes one or more cloud computing nodes with which local computing devices used by cloud consumers, such as, for example, personal digital assistant (PDA) or cellular telephone 3A, desktop computer 3B, laptop computer 3C and/or automobile computer system 3N communicate. Nodes can communicate with one another and can be grouped (not shown) physically or virtually, in one or more networks, such as Private, Community, Public or Hybrid clouds as described hereinabove or in a combination thereof. This allows cloud computing environment 2 to offer infrastructure, platforms and/or software as services for which a cloud consumer does not need to maintain resources on a local computing device. It is understood that the types of computing devices 3A-N are intended to be illustrative only and that computing nodes and cloud computing environment 2 can communicate with any type of computerized device over any type of network and/or network addressable connection (e.g., using a web browser).

Figure 2:
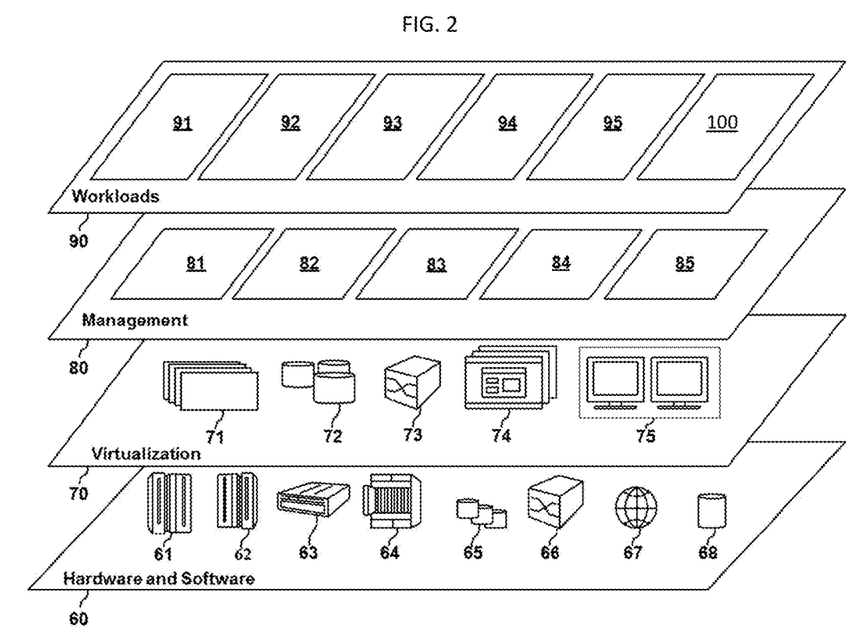
FIG. 2 depicts abstraction model layers in accordance with embodiments of the present invention.

With reference to FIG. 2, a set of functional abstraction layers provided by cloud computing environment 1 is shown. It should be understood in advance that the components, layers and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61, Reduced Instruction Set Computer (RISC) architecture based servers 62, servers 63, blade servers 64, storage devices 65 and networks and networking components 66. In some embodiments, software components include network application server software 67 and database software 68.

Virtualization layer 70 provides an abstraction layer from which the following examples of virtual entities may be provided: virtual servers 71, virtual storage 72, virtual networks 73, including virtual private networks, virtual applications and operating systems 74 and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91, software development and lifecycle management 92, virtual classroom education delivery 93, data analytics processing 94, transaction processing 95 and a cognitive illumination system 100.

With reference to FIGS. 3-6, the cognitive illumination system 100 is provided and includes one or more light sources 11 and 12, a servomechanism 13 to which the one or more light sources 11 and 12 are respectively coupled and which is configured to manipulate, to move, to orient and/or to direct the one or more light sources 11 and 12 in a space 14, a tracking assembly 15 and a processor 20. The one or more light sources 11 and 12 can be provided as any type of light emitting diode (LED), incandescent or fluorescent lamp that can emit a beam of light towards a target when they are turned on. The one or more light sources 11 and 12 can also be provided for patterned illumination (i.e., projection) in some cases. The servomechanism 13 can be provided with two or more degrees of freedom of movement and the space 14 can be any volumetric, enclosed or unenclosed spatial region.

Figure 3:
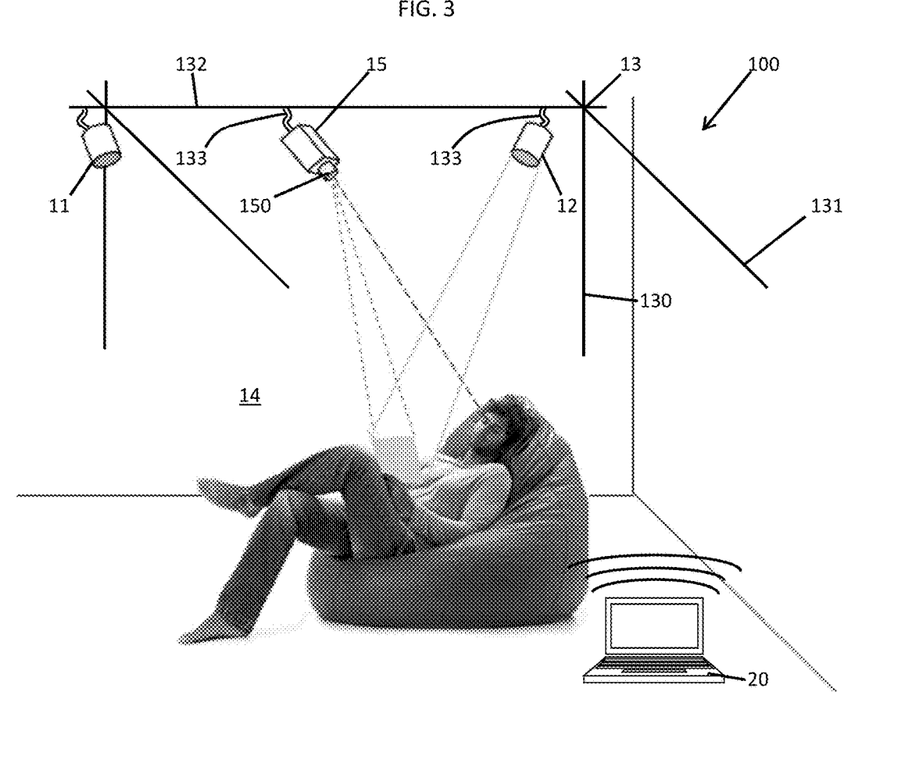
FIG. 3 is an illustration of a scene in which a cognitive illumination system in accordance with embodiments of the invention is in use.

As shown in FIG. 3 and in accordance with embodiments of the invention, the servomechanism 13 can include a z-axis guide bar 130, a y-axis guide bar 131, an x-axis guide bar 132 and connectors 133 that are angularly maneuverable and connect the one or more light sources 11 and 12 to the servomechanism 13. During operations of the cognitive illumination system 100, the one or more light sources 11 and 12 as well as components of the tracking assembly 15 to be described below are moved throughout the space 14 by the servomechanism 13 whereby the y-axis bar 131 and the x-axis bar 132 slide along the z-axis bar 131 for height adjustments, the x-axis bar 132 slides along the y-axis bar 131 for lateral adjustments and the connectors 133 slide along the x-axis bar 132 for forward and back adjustments. In addition, once the one or more light sources 11 and 12 as well as components of the tracking assembly 15 to be described below are positioned or re-positioned at a predefined or target location in the space 14, the connectors 133 can be angularly maneuvered so as to redirect or reorient the respective lines-of-sight of the one or more light sources 11 and 12 and the components of the tracking assembly 15.

Figure 4:
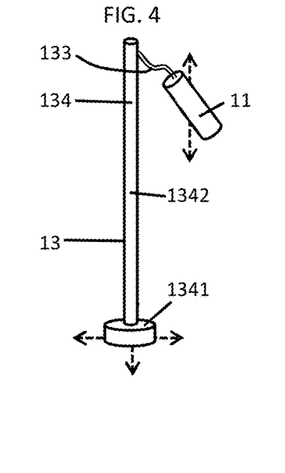
FIG. 4 is a perspective view of a servomechanism of the cognitive illumination system of FIG. 3 in accordance with embodiments of the invention.
Figure 5:
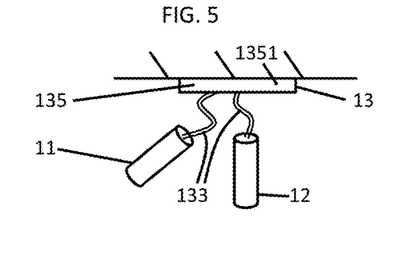
FIG. 5 is a perspective view of a servomechanism of the cognitive illumination system of FIG. 3 in accordance with embodiments of the invention.
Figure 6:
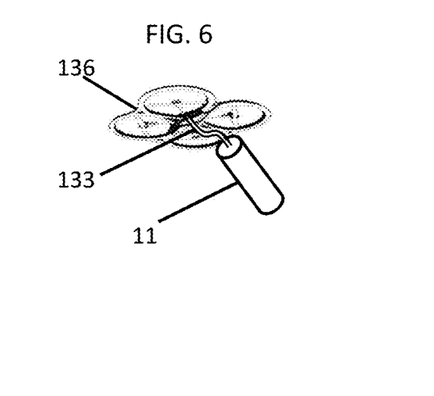
FIG. 6 is a perspective view of a servomechanism of the cognitive illumination system of FIG. 3 in accordance with embodiments of the invention.

As shown in FIGS. 4, 5 and 6 and in accordance with alternative embodiments of the invention, the servomechanism 13 can be provided as a stand feature 134 (see FIG. 4), as a ceiling fixture 135 (see FIG. 5) or as a drone 136 (see FIG. 6). The stand feature 134 includes a mobile base part 1341 that is movable in multiple directions along a floor and a vertical spine 1342 to which the connector 133 is connected such that the connector 133 and the light source 11 are movable in the vertical direction and such that the light source 11 can be redirected or reoriented by way of the angular maneuverability of the connector 133. The ceiling fixture 135 can be provided on a ceiling of the space 14 and includes a central part 1351 to which connectors 133 are connected. Here, each connector 133 is movable and capable of redirection or reorientation in multiple directions and is additionally capable of being extended or retracted as needed. The drone 136 includes one or more lift generating and flight control elements and is movable in multiple directions in the space 14. The connector 133 is connectable to the drone 136 and is movable and capable of redirection or reorientation in multiple directions and is additionally capable of being extended or retracted as needed.

While multiple embodiments of the servomechanism 13 are illustrated in FIGS. 3-6 and are described herein, it is to be understood that the features of the various embodiments of the invention can be employed jointly or separately and that still other embodiments of the invention can be provided and are within the scope of this specification.

With continued reference to FIGS. 3-6, the tracking assembly 15 is configured to capture and track various objects in the space 14. The tracking assembly 15 can include one or more movement and/or optical sensors 150 that can be coupled or otherwise connected to the servomechanism 13. Thus, the components of the tracking assembly 15 can be fixed or static with in the space 14 or capable of being moved throughout the space 14 in a similar manner as the one or more light sources 11 and 12.

Figure 7:
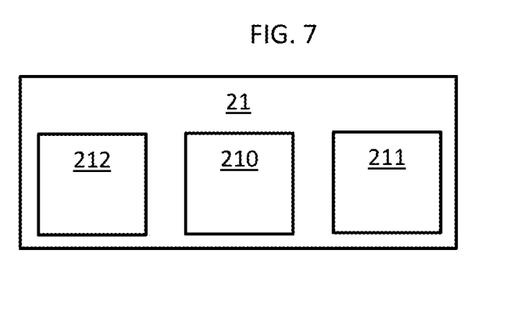
FIG. 7 is a schematic diagram of a computing device including a processor of the cognitive illumination system of FIG. 3 in accordance with embodiments of the invention.

With continued reference to FIGS. 3-6 and with additional reference to FIG. 7, the processor 20 is operably coupled to the one or more light sources 11 and 12, the servomechanism 13 and the tracking assembly 15. The processor 20 can be provided as a component of a computing device 21 such as a laptop computer (see FIG. 3), a portable computing device, a smartphone, the stand feature 134 (see FIG. 4), the ceiling fixture 135 (see FIG. 5) or the drone 136 (see FIG. 6). In any case, as shown in FIG. 7, the computing device 21 includes a central processing unit (CPU) 210, a memory unit 211 and a communications unit 212. The communications unit 212 allows the CPU 210 to communicate with the servomechanism 13 and the tracking assembly 15 (e.g., to send instructions or commands to the servomechanism 13 and to receive information and data from the tracking assembly 15) along wired or wireless communications pathways. The memory unit 211 includes various types of read only memory (ROM) and random access memory (RAM) and has executable instructions stored thereon. When executed, these executable instructions cause the CPU 210 to operate as described herein.

In particular, when the executable instructions are executed, the executable instructions cause the CPU 210 to control the one or more light sources 11 and 12 and the servomechanism 13 to set the one or more light sources 11 and 12 in a default position and to activate the one or more light sources 11 and 12 when the space 14 is occupied by a person. Next, the executable instructions cause the CPU 210 to receive information of optically captured and tracked objects in the space 14 from the tracking assembly 15 and to determine the classification, nature, characteristics and qualities of a task being undertaken in the space 14 from the received information of the captured and tracked objects in the space 14. In addition, the executable instructions cause the CPU 210 to develop an adjustable lighting plan that is appropriate for the task and which is executable by the one or more light sources 11 and 12 and the servomechanism 13. Finally, the executable instructions cause the CPU 210 to control the one or more light sources 11 and 12 and the servomechanism 13 to operate in accordance with the adjustable lighting plan.

While the discussion provided above relates to applications and algorithms running on the CPU 210, other embodiments exists. For example, all of the object recognition, task classification, etc. may take place in the cloud using one or more other processors. In such configurations, there are application programming interfaces (APIs) for these services and they are used by the local CPU 210. Thus, it is to be understood that although the following description generally refers to actions and computations undertaken by the CPU 210 such descriptions are and would be interchangeable with similar descriptions of actions and computations being undertaken in the cloud.

The information of the optically captured and tracked objects in the space 14 includes multiple elements that can be combined to develop a picture and an understanding of the activities and tasks being undertaken in the space 14. The following discussion includes descriptions of some, but not all, of the information. For example, the information can include a gaze direction of a person in the space and an identification of a type or classification of an object in the space. That is, for the scene illustrated in FIG. 3, the information can include a position of the person and, more particularly, his eyes as well as a direction his eyes are looking and a shape, coloring and characteristics of objects (if any) in his field of view that can be optically captured and tracked by the optical sensor 150.

While the information will be provided in the form of 3-D image data, the CPU 210 can use techniques such as SIFT or SURF to analyze the 3-D image to attempt to develop an understanding of the scene. Given various features of the identified 3-D objects such as its shape, size, color, etc., the CPU 210 can run a classifier (locally or in the cloud) to produce probabilities of various types of 3-D objects. Thus, the CPU 210 will determine from the information that the person in the space 14 is a person and that he has a certain body position, laying down, and that he has a certain head position, and is thus looking somewhat straight ahead. The CPU 210 will also identify another 3-D object as a book. Given these objects and the direction of gaze of the person intersecting the book, the CPU 210 will label a relationship, 'looking at', between the person and the book. Then, given the object types and relationships, the CPU 210 computes likely tasks. If the likelihood of the given task is above a threshold and a second threshold above the nearest likely second task, the CPU 210 executes the lighting plan associated with the most likely task. Executing the lighting plan then includes tracking the trajectories of the identified objects, including the person. In this case, one needs to have lighting available to illuminate the book from the angle of the person's gaze. As such, the CPU 210 will develop an adjustable lighting plan that maximizes the light provided from the one or more light sources 11 and 12 on the booklet and that provides sufficient contrasts by reducing the light provided to other regions of the space 14. In the case of the scene of FIG. 1, this means that the light source 11 will be turned off and that the light source 12 will be angled toward the booklet and turned on. Turning off the light source 11 will reduce unneeded light in the space 14 and will make the light provided from the light source 12 more effective in illuminating just the booklet and thus providing contrast. The relatively high positioning of the light source 12 will provide sufficient light to the booklet while also allowing for diffusion of the light so that it is not excessively bright and so that the room can be illuminated to some reasonable degree. If there is no likely task identified and the first threshold is not reached, the system waits but can pride feedback that it detected this situation. If the task is ambiguous and the second threshold is not reached, the system can wait but provide different feedback (e.g., a sound to sound confused).

In accordance with further embodiments of the invention, the executable instructions additionally cause the CPU 210 to customize the adjustable lighting plan for a given user, to optimize the adjustable lighting pattern by minimizing illumination of objects unrelated to the task (as noted above), to identify whether light from the light source 12 is occluded and to control the servomechanism to re-position, redirect or reorient the light source 12 to or in a non-occluded position and to adjust the adjustable lighting plan by anticipating and reacting to object movement in the space 14.

The customization of the adjustable lighting plan can provide for certain lighting patterns and colors for certain individuals and for certain tasks performed by those individuals. For example, if a given user is using the space to develop photographs, the user can need the adjustable lighting plan to be customized to only have red lighting available in the space 14 when photographic development is occurring.

Meanwhile, as to the notion of avoiding occlusion, if the person in the scene of FIG. 1 changes position or stands up, his head might be in the line of sight between the light source 12 and the booklet. In this case, the CPU 12 might instruct the servomechanism 13 to move the light source 12 to another position where it has a clearer line of sight to the booklet or, if that's not possible, might activate the light source 11 and deactivate the light source 12.

In accordance with still further embodiments of the invention, the executable instructions additionally cause or allow the CPU 210 to learn the adjustable lighting plan for one or more given users and for one or more given tasks. That is, a user will be able to interact with the CPU 210 through speech, inputted digital or analog commands and/or mechanical steering of the one or more light sources 11 and 12 and the servomechanism 13 to achieve a desired lighting effect. The CPU 210 will collect adjustment data that is reflective of such interactions such as initial and final positions and settings and update the adjustable lighting plan accordingly. A machine learning algorithm of the CPU 210 thus learns from that data to automatically adjust the adjustable lighting plan in the future for similar situations (i.e., the CPU 210 can learn over time what objects need to be lit in what tasks and what the other lighting configurations will be). A set of input parameters are extracted from each configuration, such as the operative relationships, types of objects, and so on. A set of output parameters are also recorded, such as the position and angle of the lighting sources, the level of illumination, color, and other aspects of the lighting plan. Note that in general the user would be able to change every aspect of the lighting plan manually. A method such as logistic regression, stochastic gradient descent, maximum entropy, or other algorithms is then used to learn functions to automatically adjust the output parameters given the input parameters, thus optimizing the lighting configuration. The CPU 210 can also contain an avoidance module that determines if there are objects in the space 14 that need to stay on the darker side. For example, the one or more light sources 11 and 12 might be controlled to avoid shining light directly into a user's face and to permit user faces to be lit by ambient light instead.

The learning capability of the CPU 210 can be personalized by a user himself or by CPU 210 recognition of the user. In either case, multiple adjustable lighting plans can be maintained for each user with the CPU 210 learning capability applicable to all users simultaneously or only to one user at a time. In an exemplary case, a user sits down with a drawing pad but the light does not come on. The CPU 210 recognizes an object but does not know it is a something that needs to be illuminated and thus does not associate it with the task of drawing. Then, a user in the space 14 states the following: "This is a drawing pad." The system then illuminates the drawing pad and adds the metadata to label it as a drawing pad. The CPU 210 recognizes the relationship of "looking at" and recognizes the task of "reading" but modifies the target of the task to "drawing pad" and can thus create a specialized lighting plan for "drawing" ("reading" with the target of "drawing pad"). Next time a similar situation arises, the CPU 210 will automatically adopt a same or similar adjustable lighting plan.

Figure 8A:
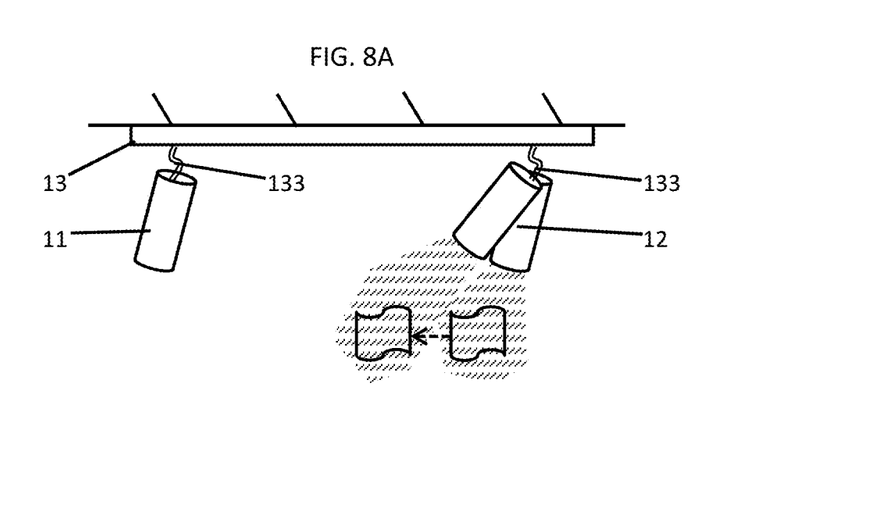
FIG. 8A is an illustration of an operation of the cognitive illumination system of FIG. 3 at an initial stage in accordance with embodiments of the invention.
Figure 8B:
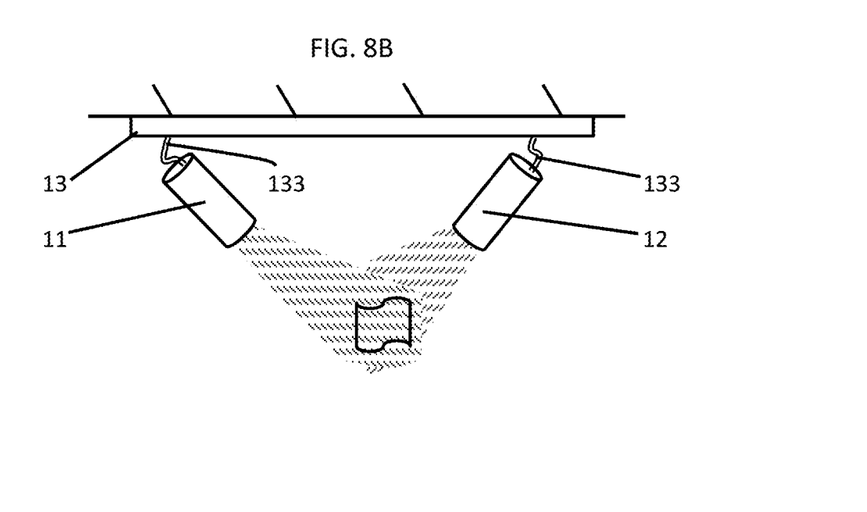
FIG. 8B is an illustration of an operation of the cognitive illumination system of FIG. 3 at an intermediate stage in accordance with embodiments of the invention.
Figure 8C:
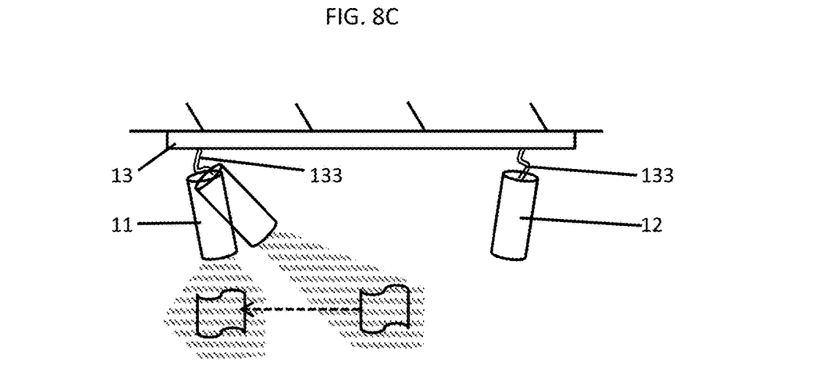
FIG. 8C is an illustration of an operation of the cognitive illumination system of FIG. 3 at a later stage in accordance with embodiments of the invention.

Finally, with reference to FIGS. 8A, 8B and 8C, if the person in the scene of FIG. 3 gets up to walk to the left side of the image while still reading from the booklet, the CPU 210 can track the person as they are walking. As long as the reading task is being recognized and its lighting plan is in effect, the system will track and illuminate the book. The CPU 210 will dynamically angle the light source 12 to continue to shine light onto the booklet (see FIG. 8A). Then, as the angle from the light source 12 becomes too shallow and the distance from the light source 12 to the booklet becomes too large, the CPU 210 can activate and begin to dynamically angle the light source 11 (see FIG. 8B) and then deactivate the light source 12 (FIG. 8C) while continuing the activation and dynamic angling of the light source 12.

Figure 9:
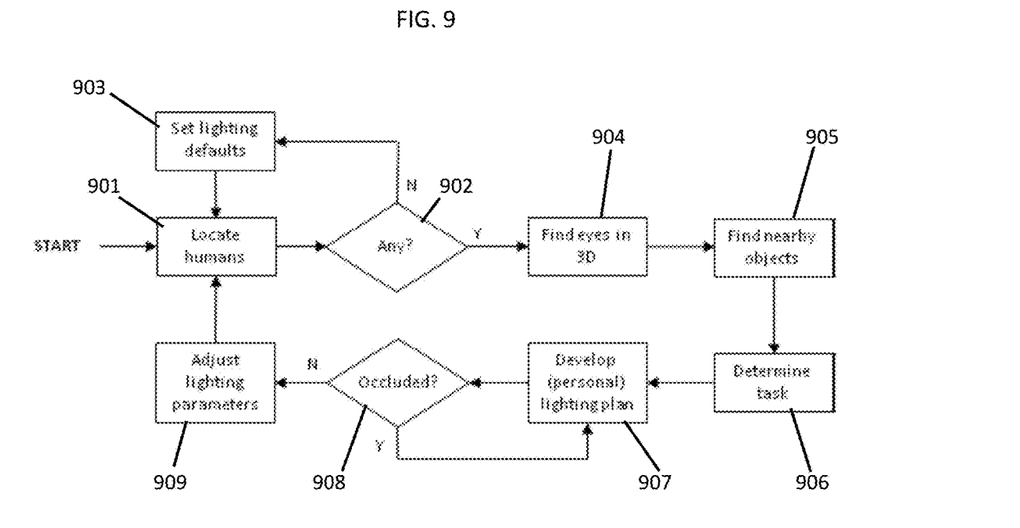
FIG. 9 is a flow diagram illustrating a method of operating a cognitive illumination system in accordance with embodiments of the invention.

With reference to FIG. 9, an operation of the cognitive illumination system 100 will now be described. Initially the tracking assembly 15 attempts to detect a presence of a person in the space 14 (901) determines if one is there or not (902). If not, lighting defaults are set (903). If a person is in the space 14, the cognitive illumination system 100 locates his eyes (904) and finds the position and size of an object of interest (e.g., a book) possibly by inferring the position of the person's hands or by other methods as described above but more generally by identifying semantics or types of the object(s) of interest, relationships between the person and object(s) of interest, functions of the object(s) of interest and anticipated trajectories of the person and the object(s) of interest (905). The cognitive illumination system 100 then determines that the person is reading from the book (906) and that the book needs illumination to support this task (907). The cognitive illumination system 100 subsequently determines that the book should be lit on the side toward the person's eyes and thus swivels the light source 12 to aim at the book, sets the optical zoom to reduce the beam angle so that it is slightly wider than the book at that distance and adjusts the intensity to provide 1000 lux at the surface. Meanwhile, because the light source 11 is non-optimally placed relative to the task, the light source 11 is left in an off state.

Once a lighting plan is developed (and customized if necessary or called for), the lighting plan is checked to see if any of the necessary light beams are occluded or blocked in some way, shape or form by the person or some object or piece of furniture (908). If so, the lighting plan is altered to work around such problems. Finally, the finished lighting plan is executed to adjust the parameters of all of the one or more light sources 11 and 12 in the space 14 (909). At this point, the cognitive illumination system 100 loops back to the beginning of the algorithm in order to track possibly changing positions of the person and the objects in the space 14 as well as to detect any change in the type of task or activity being undertaken in the space 14.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments of the invention. The terminology used herein was chosen to best explain the principles of the embodiments of the invention, the practical application or technical improvement over technologies found in the marketplace, or to enable others of ordinary skill in the art to understand the embodiments of the invention described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A cognitive illumination system comprising:
    first, second and third light sources;
    a servomechanism configured to manipulate the first, second and third light sources in a space and comprising:
        multiple guide bars for multiple axes along each of which a first connector, by which the first light source is connectable to the multiple guide bars, is provided, the first connector being movable and configured to redirect and reorient the first light source with two or more degrees of freedom of movement relative to the multiple guide bars;
        a mobile stand with a second connector, by which the second light source is connectable to the mobile stand, the second connector being configured to redirect and reorient the second light source with two or more degrees of freedom of movement relative to the mobile stand; and
        a ceiling fixture with a third connector, by which the third light source is connectable with the ceiling fixture, the third connector being configured to redirect and reorient the third light source with two or more degrees of freedom of movement relative to the ceiling fixture;
    a tracking assembly configured to capture and track objects in the space; and
    a processor communicatively coupled to the first, second and third light sources, the servomechanism and the tracking assembly;
    wherein the processor is configured to:
    receive information about the captured and tracked objects from the tracking assembly;
    determine a task being undertaken in a scene in the space from an analysis of the received information leading to an understanding of the scene by the processor;
    develop a lighting plan for the task based on the understanding of the scene, the lighting plan being executable by the first, second and third light sources and the servomechanism; and
    control the first, second and third light sources and the servomechanism according to the lighting plan in order to execute the lighting plan.

2. The cognitive illumination system according to claim 1, wherein:
    the first, second and third light sources are separate from one another and comprise a light emitting diode (LED), an incandescent or a fluorescent light source,
    the multiple guide bars, the mobile stand and the ceiling fixture are separate from one another, and
    the tracking assembly comprises at least one of movement and optical sensors.

3. The cognitive illumination system according to claim 1, wherein the information of the captured and tracked objects comprises a gaze direction of a person in the space and an identification of an object in the space.

4. The cognitive illumination system according to claim 1, wherein the processor is further configured to set the first, second and third light sources and the servomechanism in a default position.

5. The cognitive illumination system according to claim 1, wherein the processor is further configured to customize the lighting plan for a user.

6. The cognitive illumination system according to claim 1, wherein the processor is further configured to learn the lighting plan for a user.

7. The cognitive illumination system according to claim 1, wherein the processor is further configured to optimize the lighting plan by minimizing illumination of objects unrelated to the task.

8. The cognitive illumination system according to claim 1, wherein the processor is further configured to identify whether light from the first, second and third light sources is occluded and to control the servomechanism to re-position the first, second and third light sources to a non-occluded position.

9. The cognitive illumination system according to claim 1, wherein the processor is further configured to adjust the lighting plan by anticipating and reacting to object movement in the space.

10. A computer-implemented method of operating a cognitive illumination system, the method comprising:
recognizing, by a processor, a presence of objects in a space;
identifying types of the objects, relationships between the objects, functions of the objects and anticipated trajectories of the objects;
determining a task being undertaken in a scene in the space from an analysis of the identified types of the objects, relationships between the objects, functions of the objects and anticipated trajectories of the objects leading to an understanding of the scene by the processor;
developing an optimal lighting plan by the processor for the objects from the identified types of the objects, relationships between the objects, functions of the objects and trajectories of the objects based on the understanding of the scene by the processor;
moving a first connector that can redirect and reorient a first light source along multiple guide bars for multiple axes wherein the first connector redirects and reorients the first light source with two or more degrees of freedom of movement relative to the multiple guide bars;
moving a second connector of a mobile stand with the second connector being able to redirect and reorient a second light source with two or more degrees of freedom of movement relative to the mobile stand; and
moving a third connector of a ceiling fixture with the third connector being able to redirect and reorient a third light source with two or more degrees of freedom of movement relative to the ceiling fixture,
wherein the moving of the first, second and third connectors is executed in order to effectuate the optimal lighting plan.

11. The computer-implemented according to claim 10, further comprising:
minimizing an effect of light sources that are unrelated to the optimal lighting plan; and
adjusting the optimal lighting plan.

12. A computer program product for providing a cognitive illumination system, the computer program product comprising:
a processing circuit; and
a memory having program instructions stored thereon for enabling the processing circuit to execute a method comprising:
capturing and tracking objects in a space;
determining a task being undertaken in a scene in the space from an analysis of information of the captured and tracked objects leading to an understanding of the scene by the processing circuit;
developing an adjustable lighting plan for the task based on the understanding of the scene, the adjustable lighting plan being executable by first, second and third light sources and a servomechanism to which the first, second and third light sources are coupled and which is configured to manipulate the first, second and third light sources in the space,
the servomechanism comprising:
multiple guide bars for multiple axes along each of which a first connector, by which the first light source is connectable to the multiple guide bars, is provided, the first connector being movable and configured to redirect and reorient the first light source with two or more degrees of freedom of movement relative to the multiple guide bars;
a mobile stand with a second connector, by which the second light source is connectable to the mobile stand, the second connector being configured to redirect and reorient the second light source with two or more degrees of freedom of movement relative to the mobile stand; and
a ceiling fixture with a third connector, by which the third light source is connectable with the ceiling fixture, the third connector being configured to redirect and reorient the third light source with two or more degrees of freedom of movement relative to the ceiling fixture; and
controlling the first, second and third light sources and the servomechanism in accordance with the adjustable lighting plan in order to execute the adjustable lighting plan.

13. The computer program product according to claim 12, wherein:
the first, second and third light sources are separate from one another and comprise a light emitting diode (LED), an incandescent or a fluorescent light source,
the multiple guide bars, the mobile stand and the ceiling fixture are separate from one another, and
a tracking assembly comprising at least one of movement and optical sensors is disposed to capture and track the objects in the space.

14. The computer program product according to claim 12, wherein the information of the captured and tracked objects comprises a gaze direction of a person in the space and an identification of an object in the space.

15. The computer program product according to claim 12, wherein the method further comprises setting the first, second and third light sources and the servomechanism in a default position.

16. The computer program product according to claim 12, wherein the method further comprises customizing the adjustable lighting plan for a user.

17. The computer program product according to claim 12, wherein the method further comprises optimizing the adjustable lighting plan by minimizing illumination of objects unrelated to the task.

18. The computer program product according to claim 12, wherein the method further comprises:
identifying whether light from the first, second and third light sources is occluded; and
controlling the servomechanism to position the first, second and third light sources in a non-occluded position.

19. The computer program product according to claim 12, wherein the method further comprises adjusting the adjustable lighting plan by anticipating and reacting to object movement in the space.

* * * * *